US006466989B1

(12) United States Patent
Chu

(10) Patent No.: US 6,466,989 B1
(45) Date of Patent: Oct. 15, 2002

(54) AUTOMATIC NETWORK CONNECTION DEVICE FOR WIRING TO NETWORK CABLE

(75) Inventor: Hsiao-Wei Chu, Chung-Ho (TW)

(73) Assignee: Topic Semiconductor Corp., Hsinchu (TW)

( * ) Notice: Subject to any disclaimer, the term of this patent is extended or adjusted under 35 U.S.C. 154(b) by 0 days.

(21) Appl. No.: 09/272,469

(22) Filed: Mar. 19, 1999

(30) Foreign Application Priority Data

Dec. 9, 1998 (TW) ....................................... 87120424 A

(51) Int. Cl.[7] ............................................... G06F 15/16
(52) U.S. Cl. ..................... 709/250; 375/219; 374/29.01
(58) Field of Search ................................ 375/219, 257; 379/250; 455/73, 550, 557, 559; 714/820; 709/250; 374/29.01

(56) References Cited

U.S. PATENT DOCUMENTS 3,746,796 A * 7/1973 Gebhardt .................... 379/250
4,434,324 A * 2/1984 Boggio et al. ............ 178/69 R
5,371,455 A * 12/1994 Chen .......................... 320/165
5,768,301 A * 6/1998 Dreyer et al. ............... 714/820
6,212,258 B1 * 4/2001 Bella et al. .............. 379/27.03
6,215,816 B1 * 4/2001 Gillespie et al. ............ 375/219

* cited by examiner

*Primary Examiner*—Zarni Maung
*Assistant Examiner*—Wen-Tai Lin
(74) *Attorney, Agent, or Firm*—J.C. Patents

(57) ABSTRACT

A network connection device having internal circuitry capable of wiring correctly to a network cable is described. The network connection device includes an interface circuit, a switching array and a controlling circuit. First, the network connection device is physically connected to the network cable. Next, the positive and negative receiving terminals in the interface circuit are connected to a pair of signal carrying wires through the device's internal circuitry. Depending on the returned preamble field, the connections to the signal-carrying wires are judged to be either incorrect, in which case the connection has to be swapped through device's internal circuitry, or correct, in which case no swapping is required. Subsequently, the positive and negative transmission terminals are connected to a second pair of wires inside the network cable. Next, a data packet is sent out through the transmission terminal. According to the acknowledgement packed returned, the connections to the second pair of wires are judge to be either incorrect, in which case the connection has to be swapped through device's internal circuitry, or correct, in which case no swapping is required.

11 Claims, 4 Drawing Sheets

AUTOMATIC NETWORK CONNECTION DEVICE FOR WIRING TO NETWORK CABLE

CROSS-REFERENCE TO RELATED APPLICATION

This application claims the priority benefit of Taiwan application Ser. No. 87120424, filed Dec. 9, 1998, the full disclosure of which is incorporated herein by reference.

BACKGROUND OF THE INVENTION

1. Field of Invention

The present invention relates to a network connection device. More particularly, the present invention relates to an automatic network connection device capable of correctly wiring the device to a network cable.

2. Description of Related Art

As computer technologies continue to advance, many computers in one general location are often linked together to form a local area network. At present, Ethernet is the most common networking configuration. Several types of drop wires are used for connecting to various terminals in an Ethernet. Two of the most common types of wires include the coaxial cable and the twisted pair wires. Due to some advantages of twisted pair wires over coaxial cables, more twisted pairs are now used for connecting to an Ethernet. For example, the 10M/100M Base T has two pairs of twisted wires inside the cable. In other words, there are altogether four wires inside a cable. The device discussed in this invention is an automatic network connection device mostly used for the connection of terminals to the twisted pairs in an Ethernet.

FIG. 1 shows a conventional method of linking up network connection devices by a twisted pair cable. As shown in FIG. 1, one of the two networking devices 110 and 120 can be a client's computer terminal while the other one can be a hub in the network or simply other devices connected to the network. The network cable 130 has at least four strands of wires, internally. The four wires inside the network cable 130 are connected to the four signaling terminals of each networking device, respectively.

Specifically, the four wires inside the cable 130 are connected to a positive receiving terminal RX+, a negative receiving terminal RX−, a positive transmission terminal TX+ and a negative transmission terminal TX−, respectively. In fact, the positive receiving terminal RX+ and the negative receiving terming RX− together form a differential receiver circuit. Similarly, the positive transmission terminal TX+ and the negative transmission terminal TX− together form a differential transmitter circuit. Hence, each terminal of the networking devices 110 and 120 must be correctly wired together through network cable 130.

For example, the positive transmission terminal TX+ of the networking device 110 must be wired to the positive receiving terminal RX+ of the networking device 120 and the negative transmission terminal TX− of the networking device 110 must be wired to the negative receiving terminal RX− of the networking device 120. Similarly, the positive transmission terminal TX+ of the networking device 120 must be wired to the positive receiving terminal RX+ of the networking device 110 and the negative transmission terminal TX− of the networking device 120 must be wired to the negative receiving terminal RX− of the networking device 110.

Therefore, in constructing a network system, wire-matching a time-consuming process. Four wires have to be connected per user terminal and each of the wires must be carefully labeled. Normally, the job has to be done by network technicians because each of the four wires within a network cable must be connected to the correct terminal in each network connection device. If any pair of the wires is accidentally mixed up, a related part of the network may malfunction and hence may require lengthy trouble-shooting.

In light of the foregoing, there is a need to design an automatic wiring device for simplifying network cable connection.

SUMMARY OF THE INVENTION

Accordingly, the purpose of the present invention is to provide a network connection device for automatic wiring. The network connection device can pick up the correct wire inside a network cable and connect to appropriate terminals of the device without human intervention. Hence, labor can be saved and human errors can be greatly reduced.

To achieve these and other advantages and in accordance with the purpose of the invention, as embodied and broadly described herein, the invention provides a network connection device for automatic wiring. The network connection device includes an interface circuit, a switching array and a controlling circuit.

The controlling circuit is coupled to the interface circuit and the switching array responsible for overseeing the entire network connection.

The switching array has a first group of connecting terminals and a second group of connecting terminals. Each group of terminals has four terminal points. Connection between the terminal points in the first group and the terminal points in the second group is achieved by internal circuitry. The actual connection is made by the signals delivered from the controlling circuit. The first group of terminals is connected to a network cable. The network cable houses four wires so that each terminal points in the first group is connected to one of the four wires inside a network cable.

The interface circuit has a positive receiving terminal, a negative receiving terminal, a positive transmitting terminal and a negative transmitting terminal. Each of these terminals is connected to a terminal point of the second terminal group of the switching array. The controlling circuit is able to receive or transmit data through the interface circuit.

The method of operating the aforementioned network connection device for connecting to a network cable is as follows. First, as soon as the network connection device is physically connected to the wires inside a network cable, a signal is emitted from the controlling circuit to the switching array requesting that the positive receiving terminal and the negative receiver terminal of the interface circuit be connected to a pair of signal-carrying wires inside the cable. Next, the controlling circuit picks up the signals from the positive receiving terminal and the negative receiving terminal to determine if the polarity of the two wires are correctly made. If proper polarity is made, nothing changes.

However, if the polarity of the wiring connection is incorrect, the controlling circuit signals the switching array to swap their connection. Thereafter, the controlling circuit sends a signal to the switching array so that the positive transmitting terminal and the negative transmitting terminal are connected to a pair of unattached wires inside the network cable. Subsequently, a packet is send from the controlling circuit to the network cable through the positive transmitting terminal and the negative transmitting terminal. The controlling circuit then waits for an acknowledgement packet from the network cable through the positive receiving terminal and the negative receiving terminal. On receiving the acknowledgement packet regarding the polarity connection to the network cable, a proper controlling signal can be sent to the switching array. If the original connection is judged to be in error, wiring connections from the positive transmitting terminal and negative transmitting terminal to the wires inside the network cable can be swapped.

According to one preferred embodiment of this invention, the device further includes a media-independent interface (MII) circuit. The MII circuit resides within the controlling circuit and acts as a communicative link between the controlling circuit and the interface circuit. When the positive receiving terminal and the negative receiving terminal are correctly wired to the network cable, the MII circuit emits four bits of '1' in sequence to the controlling circuit. Alternatively, when the positive receiving terminal and the negative receiving terminal are incorrectly wired to the network cable, the MII circuit emits four bits of '0' in sequence to the controlling circuit.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
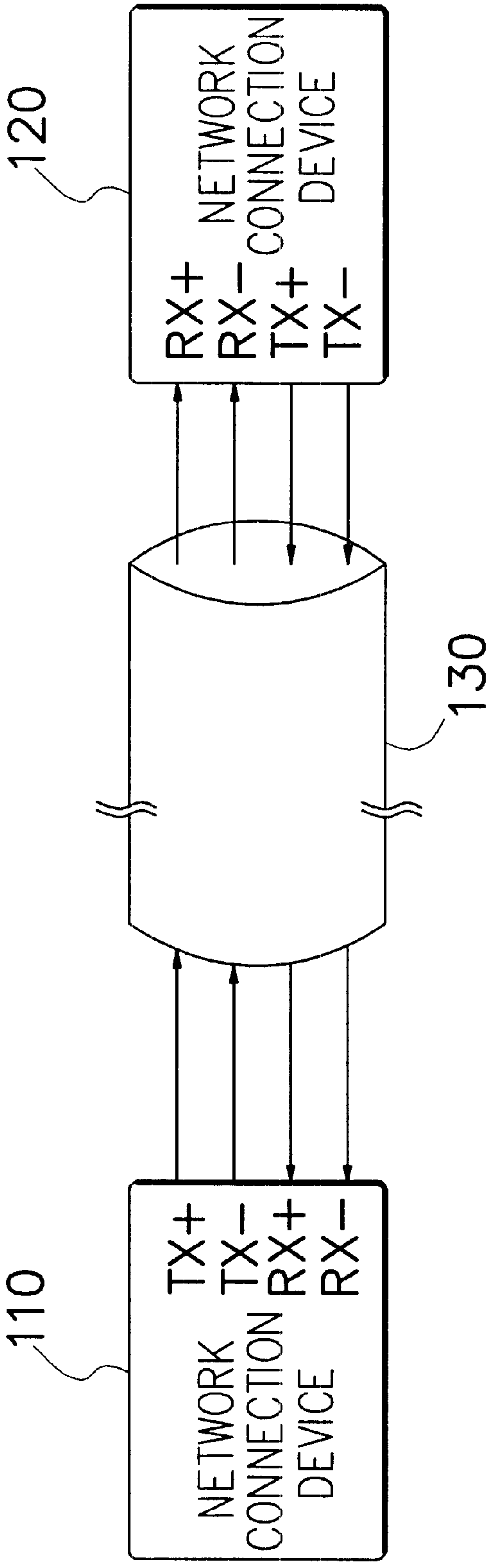
FIG. 1 (PRIOR ART)
FIG. 1 shows a conventional method of linking up network connection devices by a twisted pair cable.

Reference will now be made in detail to the present preferred embodiments of the invention, examples of which are illustrated in the accompanying drawings. Wherever possible, the same reference numbers are used in the drawings and the description to refer to the same or like parts.

Figure 2:
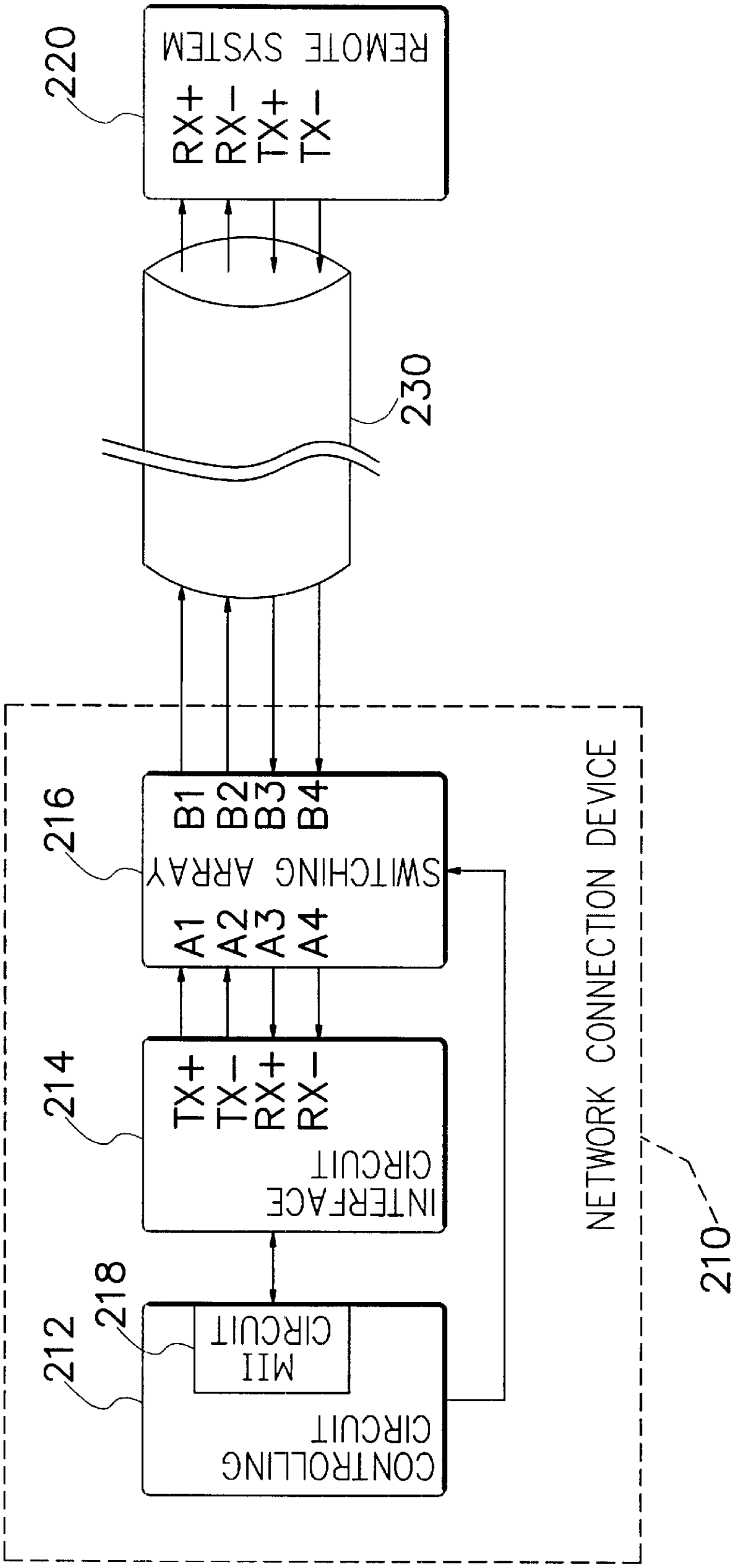
FIG. 2 shows a network connection device according to the preferred embodiment of this invention capable of forming proper wiring connection to a network cable.

FIG. 2 shows a network connection device according to the preferred embodiment of this invention capable of forming proper wiring connection to a network cable.

As shown in FIG. 2, a network connection device 210 is connected to a remote system 220 through a network cable 230. The network cable 230 has four wires inside for connecting to respective signaling terminals. The four signaling terminals include a positive receiving terminal RX+, a negative receiving terminal RX−, a positive transmission terminal TX+ and a negative transmission terminal TX−. The positive receiving terminal RX+ and the negative receiving terminal RX− work together to sense differential signals from the connected wires inside the network cable.

Similarly, the positive transmission terminal TX+ and the negative transmission terminal TX− also work together to transmit differential signals. The network connection device 210 is regarded as a local terminal. The positive receiving terminal RX+ and the negative receiving terminal RX− at the local terminal are connected to the respective positive transmission terminal TX+ and the negative transmission terminal TX− of the remote system 220 through the network cable 230. Under the same token, the positive transmission terminal TX+ and the negative transmission terminal TX− of the local terminal are connected to the respective positive receiving terminal RX+ and the negative receiving terminal RX− of the remote system 220. The remote system 220 can be a hub in the network or a computer server.

The system inside the network connection device 210 responsible for automatic wiring includes a controlling circuit 212, an interface circuit 214 and a switching array 216. The device can further include a media-independent interface (MII) circuit 218. The MII circuit 218 acts as an intermediate circuit for relaying data between the controlling circuit 212 and the interface circuit 214. In other words, the controlling circuit 212 communicates with the interface circuit 214 through the MII circuit 218. To simplify description, only the blocks relevant to the automatic wiring system are shown in FIG. 2. Obviously, anyone familiar with the electronic network may understand that other related network controlling circuits must be included before the system can work.

The controlling circuit 212 of the network connection device 210 can be implemented using hardware together with suitable software. Alternatively, the controlling circuit 212 can be implemented using firmware (not shown in the figure).

The interface circuit 214 is able to convert incoming signals from the controlling circuit 212 into a specific format for output. For example, the interface circuit 214 converts signals from the controlling circuit 212 into a format that conforms to the rules of Ethernet communication. Hence, the formatted signals are able to transmit to the remote system 220 through the network cable 230.

The interface circuit 214 has four terminals including a positive receiving terminal RX+, a negative receiving terminal RX−, a positive transmission terminal TX+ and a negative transmission terminal TX−. These four terminals can be connected to the remote system 220 through the switching array 216 and the network cable 230. However, the four terminals of the interface circuit 214 must be connected to the corresponding terminals of the remote system 220 before data can be transmitted correctly through the network.

The switching array 216 has two groups of terminals including terminals A1~A4 and B1~B4. The four terminals of the interface circuit 214 are connected to terminals A1~A4 of the switching array 216, respectively. The four terminals B1~B4 of the switching array 216 are connected to the four wires at the near end of the network cable 230. The far ends of the four wires are in turn connected to the four terminals of the remote system 220. Connection between the two groups of terminals A1~A4 and B1~B4 can be arranged in various combinations through the controlling circuit 212. By following an automatic wiring program, the correct form of connection can be found so that the four terminals of the interface circuit 214 can be properly linked to the remote system 220 for network communication. The following is a brief description of the automatic wiring program.

When the remote system 220 is connected to the far end of the network cable 230, a preamble field is sent from its positive transmission terminal TX+ and the negative transmission terminal TX− of the remote system 220 at regular time intervals. This preamble field can be a sequence of '1's. The purpose of sending out a preamble field is to synchronize two systems so that they can communicate with each other through the network cable.

Since one end of the network connection device 210 is connected to the network cable 230, two of the four terminals B1~B4 in the switching array 216 can pick up the preamble field transmitted by the remote system 220. At this point, the controlling circuit 212 can signal to the switching circuit 216 to request that the signal-carrying wires (wired to the terminals B3 and B4 of the switching circuit 216) be connected to the terminals A3 and A4, respectively.

In other words, the signal-carrying wires of the network cable 230 are connected to the positive receiving terminal RX+ and the negative receiving terminal RX− of the interface circuit 214. Therefore, the controlling circuit 212 is able to pick up the signal from the remote system 220 via the interface circuit 214. However, the two signal-carrying wires are randomly connected to the respective positive and negative receiving terminals, and so the polarity carried by wires may not incorrect. In a case where the polarity is reversed, for example, the positive receiving terminal RX+ of the interface circuit 214 is connected to the negative transmission terminal TX− of the remote system 220 and the negative receiving terminal RX− is connected to the positive transmission terminal TX+.

If that is the case, then the signal received by the controlling circuit 212 through the MII circuit 218 from the interface circuit 214 is complemented. For example, if the remote system 220 sends out a sequence of '1's (say, four '1' bits), the interface circuit 214 receives a sequence of '0's (four '0' bits). Hence, after passing through the MII circuit 218, the controlling circuit 212 receives a sequence of four '0's. On the other hand, if the polarity is correct, the controlling circuit 212 receives a sequence of four '1's.

As soon as the positive receiving terminal RX+ and the negative receiving terminal RX− are connected to the two signal-carrying wires of the network cable 230, the controlling circuit 212 is able to check whether the data coming from the MII circuit is correct or not. If the data received are four '1's, the polarity is correct. Otherwise, if four '0's are received, a correcting signal is sent from the controlling circuit 212 to the switching array 216 so that the connection of the positive receiving terminal RX+ and the negative receiving terminal RX− with respect to the network cable are swapped.

Ultimately, the positive receiving terminal RX+ and the negative receiving terminal RX− of the interface circuit 214 are connected to the positive transmission terminal TX+ and the negative transmission terminal TX− of the remote system 220, respectively. In the subsequent step, the controlling circuit 212 can signal to the switching circuit 216 so that the unassigned positive transmission terminal TX+ and the negative transmission terminal TX− of the interface circuit 214 can connect with a second pair of wires inside the network cable 230. Obviously, the second pair of wires inside the cable must be connected to the respective positive receiving terminal RX+ and the negative receiving terminal RX− of the remote system 220.

However, the positive transmission terminal TX+ and the negative transmission terminal TX− at the interface circuit 214 and the positive receiving terminal RX+ and the negative receiving terminal RX− at the remote system 220 may not be connected with matching polarities. Hence, the correct connection has to be determined.

To determine if the correct connection between TX+ and TX− at the interface circuit 214 with RX+ and RX− in the remote system 220 is established or not, the controlling circuit 212 can submit a data packet to the remote system 220 via the interface circuit 214. Thereafter, the controlling circuit 212 waits for an acknowledgement packet from the remote system 220. If the positive transmission terminal TX+ and the negative transmission terminal TX− of the interface circuit 214 are correctly connected to the respective positive receiving terminal RX+ and the negative receiving terminal RX− of the remote system 220, the remote system 220 should be able to receive the packet sent by the network connection device 210.

Shortly thereafter, an appropriate acknowledgement packet is sent to the network connection device 210 by the remote system 220. On the contrary, if the polarity is reversed, the remote system 220 sends back an incorrect packet. Hence, when the controlling circuit 212 detects an incorrect signal from the remote system 220, an incorrect polarity connection is determined. Therefore, the controlling circuit 212 can send out a signal to the switching array 216 so that the original connections leading from the positive transmission terminal TX+ and the negative transmission terminal TX− to the respective wires inside the network cable 230 are swapped. That completes the automatic wiring operation of the network connection device to the cable network.

Figure 3:
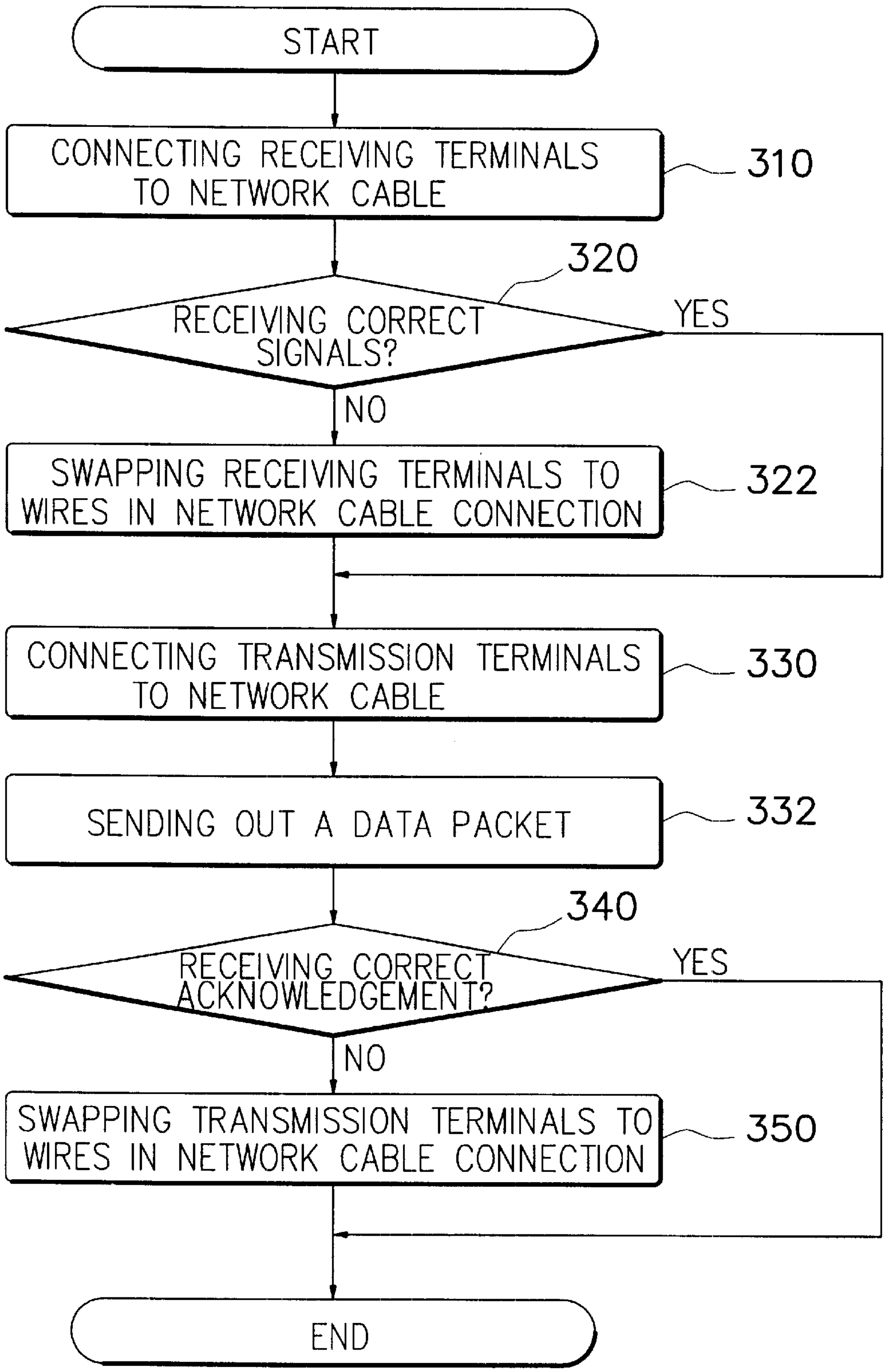
FIG. 3 is a flow chart illustrating the steps for operating the network connection device as shown in FIG. 2.

FIG. 3 is a flow chart illustrating the steps in operating the network connection device 210 as shown in FIG. 2. As shown in FIG. 3, the network connection device for the automatic wiring to the network cable operates in a number of steps. Initially, step 310 is carried out connecting the receiving terminals to a pair of signal-carrying wires of the network cable. In step 320, the controlling circuit 212 determines if the preamble field sent by the remote system is correct or not.

If the controlling circuit 212 discovers that the field from the remote system is incorrect, for example, data picked up by the MII circuit 218 are four '0's, then step 322 is carried out. Hence, the original connection from the positive receiving terminal RX+ and the negative receiving terminal RX− in the interface circuit 214 to the respective wires inside the network cable are swapped.

As soon as a correct connection from the positive receiving terminal RX+ and the negative receiving terminal RX− of the interface circuit 214 to the respective wires inside a network cable is established, step 330 is carried out. In step 330, the positive transmission terminal TX+ and the negative transmission terminal TX− in the interface circuit 214 are connected to a second pair of wires inside the network cable 230.

Next, in step 332, a data packet is sent to the remote system 220 from the controlling circuit 212 via the interface circuit 214. Then the controlling circuit 212 waits for an acknowledgement packet from the remote system 220.

Next, in step 340, the data package returned from the remote system 220 is checked by the controlling circuit. If the packet returned from the remote system 220 is found to be incorrect, then step 350 is carried out such that the original connection from the positive transmission terminal TX+ and the negative transmission terminal TX− in the interface circuit 214 to the wires inside the cable network are swapped. Finally, all four terminals in the interface circuit 214 are properly connected to the remote system 220 through the network cable 230.

Using the automatic network connection device of the above invention, there is no need to know exactly which wires are physically connected to which terminal in the remote system. Through the analysis of feedback signals, the controlling circuit is able to send a signal to the switching array requesting it to wire the positive receiving terminal RX+ and negative receiving terminal RX−, correctly. Next, a data packet is sent to the remote system. According to the acknowledgement packet received, the controlling circuit can again send a signal to the switching circuit requesting it to wire the positive transmission terminal TX+ and the negative transmission terminal TX−, correctly.

In the above embodiment, a network connection device is attached to the near end of a cable network while an ordinary network interface is attached to the far end of the network cable. In the following embodiment, an example having two network connection devices attached to both ends of a network cable is shown.

Figure 4:
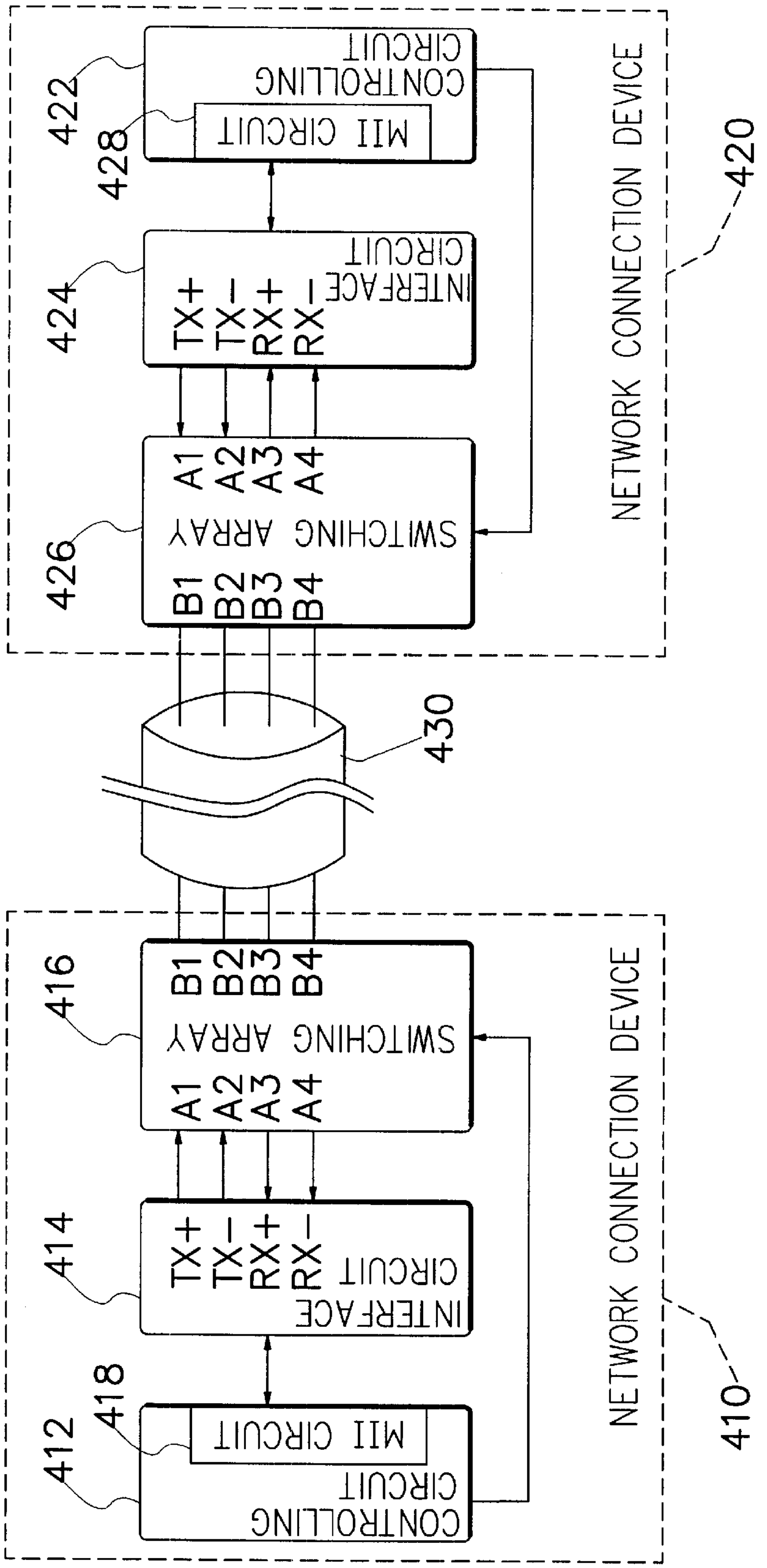
FIG. 4 is a diagram showing the connection of two similar network connection devices designed according to this invention.

FIG. 4 is a diagram showing the connection of two similar network connection devices designed according to this invention. As shown in FIG. 4, the network cable 430 is connected to two network connection devices 410 and 420. The two network connection devices 410 and 420 both have the same internal structure and operate in the same manner. In other words, the network connection device 410 comprises a controlling circuit 412, an interface circuit 414, a switching array 416 and a MI circuit 418. Similarly, the connection device 420 also comprises a controlling circuit 422, an interface circuit 424, a switching array 426 and a MII circuit 428.

First, one of the network connection devices 410 is physically connected to the network cable 430. Next, the switching array 416 functions to connect the positive transmission terminal TX+ and negative transmission terminal TX− in the interface circuit 414 to two of the signal free wires inside the network cable 430. Thereafter, the network connection device 420 is connected to the other end of the network cable 430. Then, two signal-carrying wires inside the network cable 430 are searched out. Next, the aforementioned method is applied to connect the positive receiving terminal RX+ and the negative receiving terminal RX− in the interface circuit 424 to the correct wires. Subsequently, the positive transmission terminal TX+ and the negative transmission terminal TX− in the interface circuit 424 are connected to a second pair of wires of the network cable 430.

Meanwhile, the positive receiving terminal RX+ and the negative receiving terminal RX− in the interface circuit 414 within the network connection device 410 are connected to the two signal-carrying wires of the network cable 430. Finally, the aforementioned method is again used to form the correct connection.

According to the second embodiment of this invention, when the two devices at each end of the network cable both have an automatic wiring network connection device, it is necessary only to determine the correct wiring to two of the wires inside the network cable. There is no need to transmit a data packet between the two devices in order to determine the correct connection of the remaining two wires inside the network cable.

In conclusion, one major aspect of the network connection device includes its capacity to find out the correct wires within the network cable automatically. Therefore, the device is able to match its own terminals with the corresponding terminals on the opposite side of the cable. Hence, there is no need for a special technician to install those devices, hence saving labor and cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic wiring network connection device for connecting to a network cable and then connecting to a remote system, comprising:

a switching array having a fist group of terminals and a second group of terminals, wherein the first group of the terminals are connected to the network cable and the network cable has four signal wires, each of the signal wires is separately connected to one of the terminals in the first group;

an interface circuit having a positive receiving terminal, a negative receiving terminal, a positive transmission terminal and a negative transmission terminal with each of these terminals separately connected to one of the terminals in the second group within the switching array; and a controlling circuit coupled to the interface circuit and the switching array for controlling a connection from the first group of the terminals to the second group of the terminals in the switching array for correctly transmitting data to and receiving data from the network cable via the interface circuit, wherein when the network connection device is connected to the network cable, the controlling circuit detects out two signal wires having preamble field signals in the four signal wires of the network cable and connects the selected two signal wires to the positive receiving terminal and the negative receiving terminal of the interface circuit, wherein a connection polarity is adjusted to properly reading the preamble field signals, and after the positive receiving terminal and the negative receiving terminal are correctly connected, the other two unselected signal wires of the four signal wires are connected to the positive transmission terminal and the negative transmission terminal, wherein the controlling circuit sends out a checking data packet through the transmission terminals and receives a response of the checking data packet from the receiving terminals, and a connection polarity of the transmission terminals is adjusted to properly receive an acknowledging response of the checking data packet without error.

2. The network connection device of claim 1, wherein the device further includes a media-independent interface (MII) circuit coupled to the controlling circuit and the interface circuit so that the controlling circuit can communicate with the interface circuit through the MII.

3. The network connection device of claim 1, wherein the received preamble field signals from the remote system through the receiving terminals carry a sequence of '1' binary data.

4. The network connection device of claim 1, wherein the checking data packet is a sequence of binary data.

5. A method for automatically wiring a network connection device to a network cable for connecting to a remote system, comprising the steps of:

providing a network interface that has a positive receiving terminal, a negative receiving terminal, a positive transmission terminal and a negative transmission terminal;

providing a network cable that has four wires respectively connected to the network interface;

selecting two wires having preamble field signals of the four wires from the network cable and then connecting the two selected wires respectively to the positive receiving terminal and the negative receiving terminal;

swapping the connections from the positive receiving terminal and the negative receiving terminal to the two selected wires of the network cable when the preamble field signals are incorrectly received from the positive receiving terminal and the negative receiving terminal;

connecting the positive transmission terminal and the negative transmission terminal to the other two unconnected wires of the four wires of the network cable;

sending out a data packet to the remote system through the positive transmission terminal and the negative transmission terminal; and swapping a polarity of the connections from the positive transmission terminal and the negative transmission terminal to the two wires of the four wires when the data packet incorrectly responds to the positive receiving terminal and the negative receiving terminal.

6. An automatic wiring network connection device for connecting to a remote system, comprising:

a switching array having a first group of terminals and a second group of terminals, wherein the first group of the terminals are connected to a network cable and the network cable has four wires with each of the four wires respectively connecting to one of the terminals in the first group;

an interface circuit having a positive receiving terminal, a negative receiving terminal, a positive transmission terminal and a negative transmission terminal with each of these terminals separately connected to one of the terminals in the second group within the switching array; and a controlling circuit coupled to the interface circuit and the switching array for controlling a connection from the first group of the terminals to the second group of the terminals of the switching array for correctly transmitting data to and receiving data from the network cable via the interface circuit, wherein when the network connection device is connected to the network cable, the controlling circuit detects out two signal wires having preamble field signals in the four signal wires of the network cable and connects the selected two signal wires to the positive receiving terminal and the negative receiving terminal of the interface circuit, wherein a connection polarity is adjusted to properly reading the preamble field signals.

7. The network connection device of claim 6, wherein the controlling circuit sends out a controlling signal to the switching array requesting that the positive transmission terminal and the negative transmission terminal be connected to a pair of unconnected wires inside the network cable.

8. The network connection device of claim 6, wherein the device further includes a media-independent interface (MII) circuit coupled to the controlling circuit and the interface circuit so that the controlling circuit can communicate with the interface circuit through the MII.

9. The network connection device of claim 6, wherein the received preamble field signals from the receiving terminals carry a sequence of '1' binary data.

10. The network connection device of claim 9, wherein after the receiving terminals are correctly connected, the other two unselected wires of the four wires are respectively connected to the transmission terminals, wherein the controlling circuit sends out a data packet with a sequence of "1" binary data to the remote system through the transmission terminals and receives a response of the data packet from remote system through the receiving terminals, wherein a connection polarity of the transmission terminals remains if the received response of the data packet is also the sequence of "1" binary data, and the connection polarity of the transmission terminals is swapped if the received response of the data packet is a sequence of "0" binary data.

11. A method for automatically wiring a network connection device to a network cable for connecting to a remote system, the network cable having four wires, the method comprising:

sensing the four wires of the network cable to determine two wires of the four wires being applied first acknowledge signals from the remote system;

respectively connecting the two wires applied with first acknowledge signals to a positive receiving terminal and the negative receiving terminal of an interface circuit;

checking the polarity of two wires applied with the first acknowledge signals in accordance with the first acknowledge signals, if the polarities of the two wires are reversed and the first acknowledge signals are incorrectly received from the two wires applied with the first acknowledge signals, swapping the connections between the positive receiving terminal and the negative receiving terminal to the two wires applied with the first acknowledge signals;

respectively connecting the positive receiving terminal and the negative receiving terminal of the interface circuit to a positive receiving terminal and a negative receiving terminal of the network connection device; and the network connection device sending out second acknowledge signals to the remote system through a positive transmission terminal and a negative transmission terminal of the network connection device respectively to the two wires which do not carry the first acknowledge signals, if the second acknowledge signals incorrectly responds to the positive receiving terminal and the negative receiving terminal of the network connection device, swapping a polarity of the connections from the positive transmission terminal and the negative transmission terminal to the two wires which do not carry the first acknowledge signals.

* * * * *